US010295688B2

(12) United States Patent
Ramirez-Perez et al.

(10) Patent No.: US 10,295,688 B2
(45) Date of Patent: May 21, 2019

(54) ATTENUATING INTERNAL MULTIPLES FROM SEISMIC DATA

(75) Inventors: Adriana Citlali Ramirez-Perez, Weybridge (GB); Alan G. Teague, Houston, TX (US); Milton A. Walz, Deer Park, TX (US); Zhiming Wu, Katy, TX (US)

(73) Assignee: WESTERNGECO L.L.C., Houston, TX (US)

( * ) Notice: Subject to any disclaimer, the term of this patent is extended or adjusted under 35 U.S.C. 154(b) by 0 days.

(21) Appl. No.: 13/113,218

(22) Filed: May 23, 2011

(65) Prior Publication Data
US 2012/0041682 A1 Feb. 16, 2012

Related U.S. Application Data

(60) Provisional application No. 61/372,128, filed on Aug. 10, 2010.

(51) Int. Cl.
*G01V 1/28* (2006.01)
*G01V 1/00* (2006.01)
*G01V 1/36* (2006.01)

(52) U.S. Cl.
CPC .......... *G01V 1/364* (2013.01); *G01V 2210/56* (2013.01)

(58) Field of Classification Search
CPC ..... G01V 2210/56; G01V 1/364; G01V 1/282
USPC ................... 702/14, 17; 367/38, 52
See application file for complete search history.

(56) References Cited

U.S. PATENT DOCUMENTS

| 6,832,161 | B1* | 12/2004 | Moore ............................ 702/17 |
| 7,796,467 | B2 | 9/2010 | Bisley et al. |
| 8,164,978 | B2 | 4/2012 | Terenghi et al. |
| 2005/0090987 | A1* | 4/2005 | Amundsen et al. ............ 702/14 |
| 2008/0162051 | A1 | 7/2008 | Ikelle |
| 2009/0092007 | A1* | 4/2009 | Kitchenside ................... 367/38 |
| 2009/0245022 | A1 | 10/2009 | Dragoset, Jr. |
| 2010/0074052 | A1* | 3/2010 | Terenghi et al. ............... 367/52 |
| 2010/0135114 | A1 | 6/2010 | Teague et al. |
| 2010/0161235 | A1 | 6/2010 | Ikelle |

FOREIGN PATENT DOCUMENTS

WO          9510787          4/1995

OTHER PUBLICATIONS

International Search Report and Written Opinion of PCT Application No. PCT/US2011/041575 dated Feb. 27, 2012.
Baumstein et al., "An upside-down approach to efficient surface-related and interbed multiple prediction," SEG Las Vegas Annual Meeting, 2008: pp. 2466-2470.

(Continued)

Primary Examiner — Manuel A Rivera Vargas
(74) Attorney, Agent, or Firm — Michael Guthrie

(57) ABSTRACT

A method for removing internal multiples from collected data, such as seismic data. The method includes predicting internal multiples for each horizon in a plurality of horizons that created the internal multiples. The internal multiples may be predicted from the seismic data in one pass. After predicting the internal multiples, the method includes creating a separate model of internal multiples for each horizon based on the predicted internal multiples for each horizon. The method then iteratively subtracts each separate model of internal multiples for each horizon from the seismic data.

15 Claims, 7 Drawing Sheets

(56) References Cited

OTHER PUBLICATIONS

El-Emam et al., "Interbed multiple prediction and attenuation: Case history from Kuwait," SEG/Houston Annual Meeting, 2005: pp. 448-452.

Moore, "Practical implementation of interbed multiple attenuation," Exporation Geophysics, 2001, vol. 32(2): pp. 080-088.

Verschuur et al., "Comparing the interface and point scatterer methods for attenuating multiples: a study with synthetic data—Part 1," SEG Expanded Abstracts, 1998: pp. 1-4.

Verschuur et al., "Removal of Interbed Multiples," EAGE 58th Conference and Technical Exhibition—Amsterdam, Jun. 1996: pp. 1-2.

Berkhout et al., "Estimation of multiple scattering by iterative inversion, Part 1: Theoretical considerations,"Geophysics, Sep.-Oct. 1997, vol. 62(5): pp. 1586-1595.

Jakubowicz, "Wave Equation Prediction and Removal of Interbed Multiples,"EAGE 60th Conference and Technical Exhibition, Jun. 1998: pp. 1-2.

Jakubowicz, "Wave equation prediction and removal of interbed multiples,"SEG Expanded Abstracts, 1998: pp. 1-4.

Kelamis et al., "Case History: Surface-related multiple elimination on land seismic data-Strategies via case studies,"Geophysics, May-Jun. 2000, vol. 65(3): pp. 719-734.

Kelamis et al., "Data-driven internal multiple attenuation - Applications and issues on land data,"SEG Int'l Exposition and 72nd Annual Meeting, Oct. 2002: pp. 1-4.

Koek et al., "Regularization of 3-D seismic data in two steps,"SEG Expanded Abstracts, 1997: pp. 1-2.

Kroode, "Prediction of internal multiples,"Wave Motion, 2002, vol. 35: pp. 315-338.

Ronen, "Wave-equation trace interpolation,"Geophysics, Jul. 1987, vol. 52(7): pp. 973-984.

Wang et al., "Wave-equation based residual multiple prediction and elimination in migration depth domain as an aid to seismic interpretation,"SEG Houston International Exposition and Annual Meeting, 2009: pp. 1-5.

Weglein et al., "An inverse-scattering series method for attenuating multiples in seismic reflection data,"Geophysics, Nov.-Dec. 1997, vol. 62(6): pp. 1975-1989.

Xu et al., "Antileakage Fourier transform for seismic data regularization,"Geophysics, Jul.-Aug. 2005, vol. 70(4): pp. V87-V95.

Examination Report for the equivalent GB patent application 1302781.8 dated on Feb. 9, 2016.

* cited by examiner

ATTENUATING INTERNAL MULTIPLES FROM SEISMIC DATA

CROSS-REFERENCE TO RELATED APPLICATIONS

This application claims benefit of U.S. provisional patent application Ser. No. 61/372,128, titled, GENERATING AND SUBTRACTING INTERNAL MULTIPLE'S MODELS USING XIMP, filed Aug. 10, 2010, which is herein incorporated by reference.

BACKGROUND OF THE INVENTION

1. Field of the Invention

Implementations of various technologies described herein generally relate to methods and systems for attenuating internal signal multiples in seismic data.

2. Description of the Related Art

The following descriptions and examples are not admitted to be prior art by virtue of their inclusion within this section.

Seismic surveying is a method for determining the structure of subterranean formations in the earth. Seismic surveying typically utilizes seismic energy sources which generate seismic waves and seismic receivers which detect seismic waves. Both the sources and receivers may be strategically repositioned to cover the survey area.

The seismic energy sources may propagate seismic waves into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer.

The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

The seismic waves that are detected by the receivers may include primaries and multiples. A primary may be a seismic wave that has reflected only once off an interface before being detected by the seismic receiver. A multiple, on the other hand, may be a seismic wave that has reflected off an interface more than once, i.e., multiple times. Multiples may include what are known as internal or interbed multiples. An internal multiple may be a seismic wave that has reflected back and forth between the top and bottom of a single formation, e.g., a rock layer, multiple times.

Multiples may represent noise in the recorded traces. As such, the analysis for determining the composition of the subterranean formations typically includes a process to attenuate the multiples. Internal multiple attenuation is a method of processing a recorded wavefield to remove internal multiples present within the recorded traces.

Various methods have been used for the removal of internal multiples from recorded traces. For example, internal multiples may be observed to occur at a particular time after a primary reflection where the time depends on subsurface layer thickness and trace offset. The offset may be the distance between the source and receiver. This fact has been used in various schemes to remove multiples.

Other methods involve complex ray tracing schemes which generate a synthetic multiple wave and subtract it from the actual wave to obtain a supposedly multiple free record. However, these methods are very awkward in that they require significant knowledge of the subterranean structure before the synthetic wave can be generated. Similar synthetic multiples can be generated using methods not directly involving ray tracing, e.g., field propagation techniques, but again these require detailed knowledge of the subsurface, and as such, are not as practical as would be desired.

SUMMARY

Described herein are implementations of various technologies for a method for removing internal multiples from seismic data. In one implementation, the method for removing internal multiples from seismic data may include predicting internal multiples for each horizon in a plurality of horizons that created the internal multiples. The internal multiples may be predicted from the seismic data in one pass. After predicting the internal multiples, the method may include creating a separate model of internal multiples for each horizon based on the predicted internal multiples for each horizon. The method may then iteratively subtract each separate model of internal multiples for each horizon from the seismic data.

In one implementation, the internal multiples for each horizon may be predicted based on an internal multiple prediction algorithm. In yet another implementation, the internal multiple prediction algorithm may be:

$$PIM(x_r|x_s;t) = \int_{x_1} dx_1 \int_{x_2} dx_2 D_1(x_s|x_1;t) * D_2(x_1|x_2;t) \cdot D_3(x_2|x_r;t)$$

where $x_r$ represents a trace receiver location, $x_s$ represents a source location, $x_1$ represents a variable receiver location of traces with a source at $x_s$ over which an integration occurs, $x_2$ represents a variable source location of traces with a receiver at $x_r$ over which the integration occurs, $D_1$ represents input data with source $x_s$ and receivers at $x_1$ having a top mute of data with times shorter than or equal to a travel time for an event generator, $D_2$ represents input data with source or receiver at $x_1$ and receiver or source at $x_2$, and includes the event generator, $D_3$ represents input data with receiver $x_r$ and sources at $x_2$ having a top mute of data with times shorter than or equal to a travel time for an event generator, t represents time, * represents correlation, and · represents convolution.

In yet another implementation, each of the predicted internal multiples for each horizon may include duplicate internal multiples from shallower horizons. In yet another implementation, each separate model of internal multiples for each horizon may be free of the duplicate internal multiples from shallower horizons.

In yet another implementation, the separate model of internal multiples for each horizon may be created by adaptively subtracting predicted internal multiples of shallower horizons from the predicted internal multiples for each horizon. In yet another implementation, the predicted internal multiples of shallower horizons may be adaptively subtracted from the predicted internal multiples for each horizon by (1) identifying internal multiples of each shallower horizon in one or more predicted internal multiples for an $i^{th}$ horizon; (2) removing the identified multiples; and repeating steps (1)-(2) for each subsequent horizon.

In yet another implementation, each separated model of internal multiples for each horizon is iteratively subtracted from the seismic data using an adaptive subtraction technique.

Described herein are implementations of various technologies for an information processing apparatus for use in a computing system, having means for performing any of the methods disclosed above.

Described herein are implementations of various technologies for a system for attenuating internal multiples in data may include a computer system having a processor and a memory having program instructions configured to predict internal multiples for each horizon in the seismic data in one pass, create a separate model of internal multiples for each horizon based on the predicted internal multiples for each horizon, and iteratively subtract each separate model of internal multiples for each horizon from the seismic data.

In yet another implementation, a method for attenuating internal multiples in data may include predicting internal signal multiples for at least two of a plurality of reflective layers, creating a separate model of internal signal multiples for each of the at least two of the plurality of reflective layers based on the predicted internal signal multiples, and iteratively subtracting each separate model of internal signal multiples from data.

In yet another implementation, the internal signal multiples for each of the at least two of the plurality of reflective layers are predicted in one pass. In yet another implementation, each of the predicted internal signal multiples for the at least two of the plurality of reflective layers may include duplicate internal signal multiples from one or more shallower reflective layers of the at least two of the plurality of reflective layers.

In yet another implementation, each separate model of internal signal multiples for each of the at least two of the plurality of reflective layers is free from the duplicate internal multiples from the shallower reflective layers. In yet another implementation, the separate model of internal signal multiples for each of the at least two of the plurality of reflective layers may include: (1) identifying internal signal multiples of each shallower reflective layer in one or more predicted internal signal multiples for an $i^{th}$ reflective layer; (2) removing the identified signal multiples; and repeating steps (1)-(2) for each subsequent reflective layer.

Described herein are implementations of various technologies for an information processing apparatus for use in a computing system, having means for performing any of the methods disclosed above.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
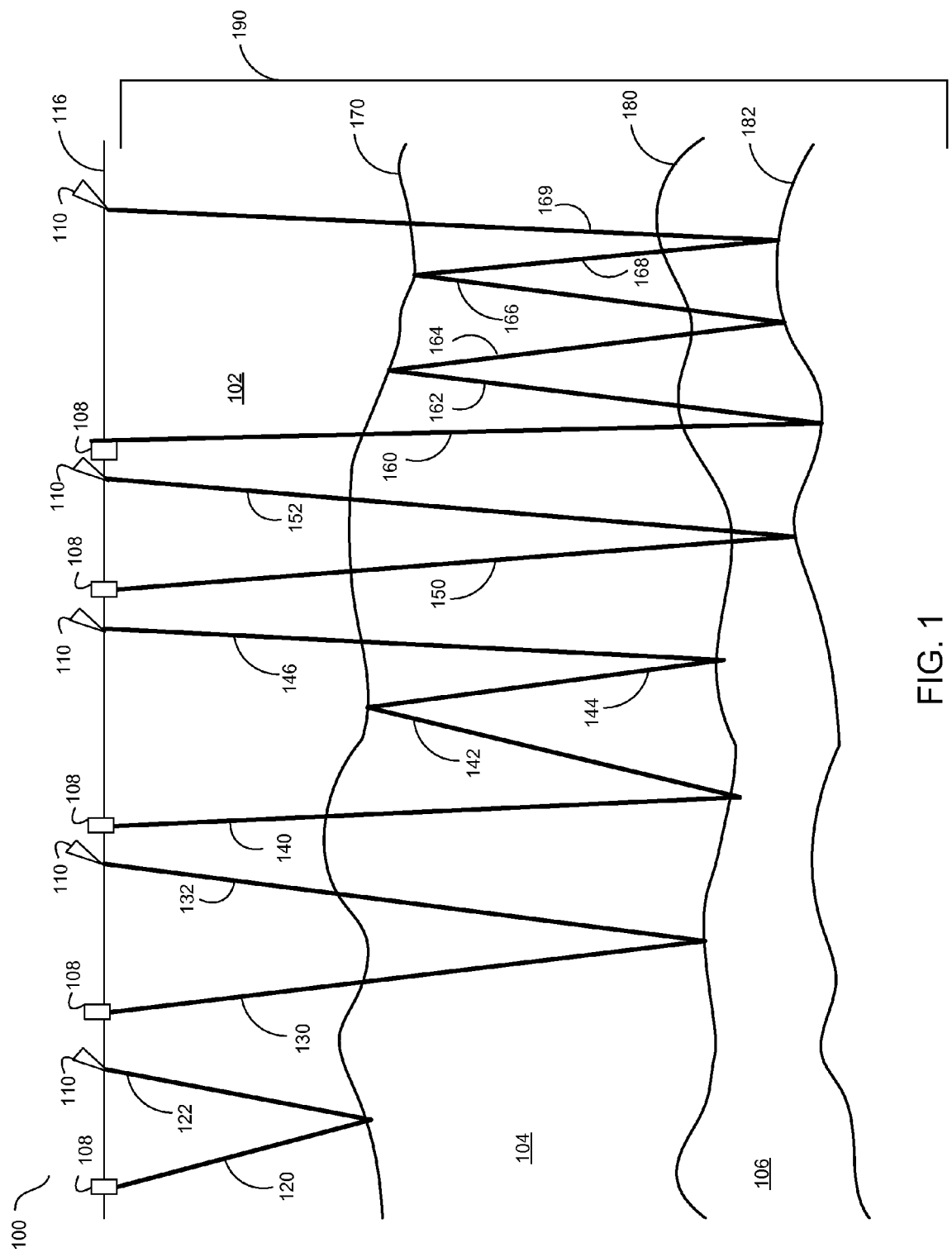
FIG. 1 illustrates a schematic diagram of a system for obtaining seismic data signals from a subsurface area in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various techniques described herein. In one implementation, a computer application may predict internal multiples for each horizon of a plurality of horizons based on seismic data. The internal multiples may be predicted using an internal multiple prediction algorithm. Although the predicted internal multiples for each horizon include a model of the internal multiples for each horizon, they also include duplicate internal multiples that correspond to internal multiples of shallower horizons.

In order to remove these duplicate internal multiples, the computer application may create a separate model of internal multiples for each horizon based on the predicted internal multiples for each horizon. In one implementation, the predicted internal multiples for the shallowest horizon may be considered to be the separate model of internal multiples for the shallowest horizon. Using the separate model of internal multiples for the shallowest horizon, the computer application may then create the separate model of internal multiples for a subsequent (i.e., deeper) horizon by adaptively subtracting the separate model of internal multiples for each preceding horizon from the predicted internal multiples of the subsequent horizon. Therefore, in order to create the separate model of internal multiples for subsequent horizons, the separate model of internal multiples for each preceding horizon should be created first.

For example, in order to create the separate model of internal multiples for the third deepest horizon (i.e., horizon 3), the separate model of internal multiples for horizon 2 and horizon 1 should be created first. Similarly, in order to create the separate model of internal multiples for horizon 2, separate model of internal multiples for horizon 1 should be created first. Since the separate model of internal multiples for horizon 1 is equal to the predicted internal multiples for horizon 1, the computer application may adaptively subtract the predicted internal multiples for horizon 1 from the predicted internal multiples for horizon 2 to acquire the separate model of internal multiples for horizon 2. Now, in order to create the separate model of internal multiples for horizon 3, the separate model of internal multiples for horizon 1 and the separate model of internal multiples for horizon 2 may each be adaptively subtracted from the predicted internal multiples for horizon 3.

After determining the separate model of internal multiples for each horizon, the computer application may iteratively subtract each separated model of internal multiples from the seismic data. For instance, the computer application may subtract the separate model of internal multiples for the shallowest horizon from the seismic data to generate seismic data without internal multiples from the shallowest horizon. The computer application may then subtract the separate model of internal multiples for the subsequent horizon from the seismic data without internal multiples from the shallowest horizon to generate seismic data without internal multiples from the shallowest horizon and the subsequent horizon. The computer application may repeat these steps until each separate model of internal multiples for each horizon has been subtracted from the seismic data.

One or more implementations of various techniques for removing internal multiples from seismic data will now be described in more detail with reference to FIGS. 1-4 in the following paragraphs.

FIG. 1 illustrates a schematic diagram of a system 100 for obtaining seismic data signals from a subsurface 190 in accordance with one or more implementations of various techniques described herein. The subsurface 190 may include subterranean formations 102, 104 and 106 to be explored. The subterranean formations 102, 104 and 106 may be separated from lower formations by interfaces 170, 180 and 182, respectively. In one implementation, the interface 170 may be an internal multiple generator, as described below.

The seismic energy sources 108 and seismic receivers 110 may be positioned on the surface 116. The seismic source 108 may create seismic waves in the subsurface 190. A portion of the seismic waves may travel downward through the subsurface 190. When the seismic waves reach a seismic reflector, such as interfaces 170, 180 or 182, a portion of the seismic waves may reflect upward. Another portion of the seismic waves may continue downward. The receiver 110 may sense the reflected waves that reach the surface 116 and generate representative signals.

In a scenario where a seismic wave may reach an interface 180 or interface 182 that is below the internal multiple generator 170, internal multiples may be generated. For example, the seismic waves may reflect upward from the interface 180. When the reflected waves reach the internal multiple generator 170, a portion of the waves may continue towards the surface 116, and another portion of the waves may reflect downward. Continuing in this fashion, seismic waves may reflect multiple times between upward reflectors, such as the interfaces 180, 182, and the internal multiple generator 170, as described more fully below.

Primary reflections are those seismic waves which have reflected only once, from the interfaces 170, 180 or 182 before being detected by the seismic receiver 110. An example of a primary reflection is shown in FIG. 1 by raypaths 120, 122; raypaths 130, 132; and raypaths 150, 152. These particular primary reflections may contain desired information about the subterranean formations 102, 104 and 106, respectively.

Internal multiples may be those waves which have reflected multiple times between the internal multiple generator 170, and upward reflectors, such as the formation interfaces 180, 182, before being sensed by a receiver 110. An example of an internal multiple is shown by raypaths 140, 142, 144 and 146.

The internal multiple starting at raypath 140 is a multiple of order one, since the multiple contains one downward reflection from the internal multiple generator 170. An example of an internal multiple of order 2 is shown by raypaths 160, 162, 164, 166, 168 and 169. This interbed multiple of order two contains two downward reflections from the internal multiple generator 170. In general, an internal multiple is of order, i, if the multiple contains i downward reflections from internal multiple generators such as 170. As stated previously, internal multiples are extraneous noise which may obscure the desired primary reflection.

Figure 2:
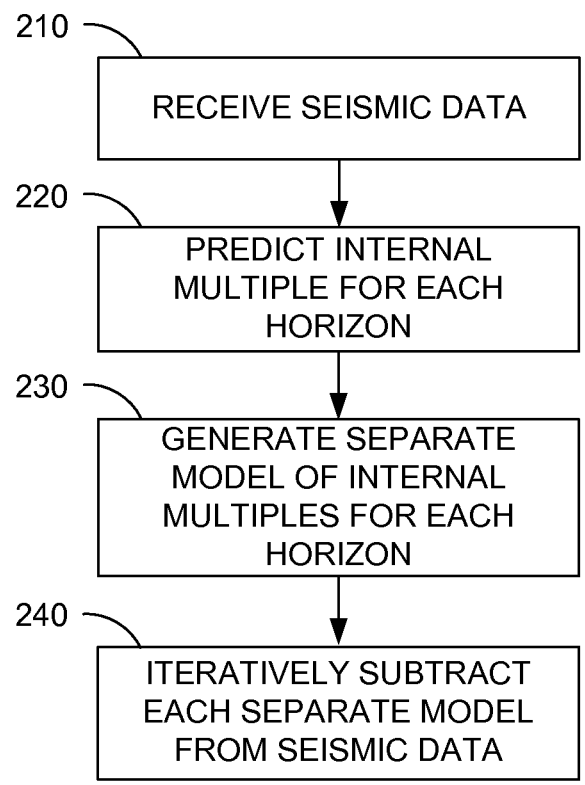
FIG. 2 illustrates a flow diagram of a method for removing internal multiples from seismic data in accordance with implementations of various techniques described herein.

FIG. 2 illustrates a flow diagram of method 200 for removing internal multiples from seismic data in accordance with implementations of various techniques described herein. In one implementation, method 200 may be performed by a computer application. It should be understood that while method 200 indicates a particular order of execution of operations, in some implementations, certain portions of the operations might be executed in a different order. Further, in some implementations, additional operations or steps may be added to method 200. In other implementations, some operations or steps may be omitted.

Currently in the prior art, if internal multiples due to each horizon are predicted in one pass, the resulting model of internal multiples for each horizon will include duplicate internal multiples for each horizon because the prediction algorithm will generate internal multiples for each horizon more than one time. Although the duplicate internal multiples for each horizon may occur at the same time as the actual internal multiples for each horizon, the duplicate internal multiples may have different amplitude magnitudes and/or polarities which make attenuating the actual internal multiples in seismic data difficult. As such, in order to attenuate internal multiples in the seismic data, prior art internal multiple attenuation methods predict the internal multiples for each horizon individually instead of in one pass.

For instance, one prior art method for attenuating internal multiples in seismic data (i.e., layer-stripping) may include predicting the internal multiples due to the shallowest horizon (e.g., horizon 1) from the input seismic data and removing the predicted internal multiples due to horizon 1 from the input seismic data to generate a model of the seismic data without the internal multiples due to horizon 1. In order to remove the internal multiples due to a deeper horizon (e.g., horizon 2), the internal multiples due to horizon 2 may be predicted using the model of the seismic data without the internal multiples due to horizon 1 (i.e., modified seismic data model). After determining the predicted internal multiples due to horizon 2 in the modified seismic data model, the predicted internal multiples due to horizon 2 may be removed from the modified seismic data model, thereby creating another modified seismic data model without internal multiples from horizons 1 and 2. This iterative process may then be used to remove the internal multiples that occur due to any subsequent/deeper horizon. In this manner, the internal multiples for any given horizon cannot be predicted until the internal multiples for each preceding/shallower horizon have been predicted and removed from the seismic data. Consequently, removing internal multiples for a plurality of horizons can be a time intensive and expensive procedure.

Method 200 describes a process for removing internal multiples for a plurality of horizons by generating a model for each horizon in a single run/pass of an internal multiple prediction algorithm. This is in contrast to the process for removing internal multiples described above which independently generates a model for each horizon using a modified model of the original seismic data where internal multiples from shallower horizons have been removed. However, in method 200, each model of internal multiples may include duplicate internal multiples from preceding/shallower horizons. For instance, if an internal multiple model for horizon 2 was generated using an internal multiple prediction algorithm, the internal multiples due to horizon 1 would be processed as if they were primary reflections. As such, the internal multiple model for horizon 2 would include duplicate internal multiples of horizon 1 embedded therein. These duplicate internal multiples of horizon 1 may have incorrect amplitudes and/or polarities that may be difficult to remove from the input seismic data. Also, if the internal multiples are duplicated in more than one model, when a model of internal multiples for each horizon is generated in a single run/pass, the duplicate internal multiples may be subtracted more than once.

Method 200 therefore includes a process for iteratively filtering these duplicate internal multiples from internal multiple prediction models for various horizons. By being able to iteratively filter the duplicate internal multiples, the internal multiple prediction models for a plurality of horizons may be generated during a single run of the internal multiple prediction algorithm. As a result, the time and costs associated with accurately removing internal multiples from seismic data may be significantly reduced because internal multiple models are not be generated for each horizon using a modified model of the preceding horizon.

At step 210, the computer application may receive seismic data. The seismic data may include information pertaining to primary reflections and internal multiple reflections.

At step 220, the computer application may predict the internal multiples for each horizon in the subsurface of the earth that corresponds to the seismic data. The predicted internal multiples for each horizon (i.e., model of internal multiples for each horizon) may be generated in one run/pass of an internal multiple prediction algorithm.

Step 220 benefits from the fact that the same seismic data may be used to predict the internal multiples for different horizons.

In one implementation, the internal multiples may be predicted using an internal multiple prediction algorithm known as Extended Internal Multiple Prediction (XIMP)™ and is shown below:

$$PIM(x_r,|x_s;t) = \int_{x_1} dx_1 \int_{x_2} dx_2 D_1(x_s|x_1;t) * D_2(x_1|x_2;t) \cdot D_3(x_2|x_r;t)$$

where $x_r$ represents the trace receiver location, $x_s$ represents the source location, represents the variable receiver location of traces with source at $x_s$ over which we integrate, $x_2$ represents the variable source location of traces with receiver at $x_r$ over which we integrate, t represents time, * represents correlation, · represents convolution. $D_2$ is the portion of the data representing the generating horizon, and it contains the event corresponding to the interface in the subsurface interpreted as an internal multiple generator. $D_2$ represents the multiple generator from input data having source or receiver at $x_1$ and receiver or source at $x_2$, and is achieved (in time domain) by muting out all events except for the one selected as the internal multiple generator. $D_1$ represents input data having a source at $x_s$ and receivers at and contains a top mute of data with times shorter than or equal to a travel time for the event generator $D_2$. $D_3$ represents input data having a receiver at $x_r$ and sources at $x_2$, and contains a top mute of data with times shorter than or equal to a travel time for the event generator $D_2$.

$D_1$ and $D_3$ contain a set of recorded events such that each of the recorded events has a travel time longer than the travel time of the event generator (event in $D_2$). If the events in have travel times represented by the subscript i, the events in $D_3$ will be then represented with a subscript k, and the event in $D_2$ will be represented with the subscript j. An interpretation of the above equation would then lead to the prediction of internal multiples having travel times equal to $(t_i + t_k - t_j)$. As such, the travel times of the events in $D_1$ and $D_3$ are added together and the travel time from the event generator, $D_2$, is subtracted from the sum of the travel times of the events in and $D_3$. In general, the predicted travel times correspond to the actual travel times of true internal multiples in the data. The prediction of internal multiples may be generated by summing (integrating) over all correlation/convolution combinations of input data $x_s - x_1$, $x_r - x_2$, and $x_1 - x_2$. In general, all these combinations of traces result in different travel times $(t_i + t_k - t_j)$, but the correct travel time may dominate the incorrect combinations which tend to destructively interfere with each other.

After predicting the internal multiples for each of the horizons using the Extended Internal Multiple Prediction (XIMP), each generated model of internal multiples for each horizon may include duplicate internal multiples that correspond to internal multiples of shallower horizons.

At step 230, the computer application may generate a separate model of internal multiples for each horizon based on the predicted internal multiples for each horizon (determined at step 220). The separate model of internal multiples for each horizon may be created by adaptively filtering the duplicate internal multiples from the predicted internal multiples for each horizon. By adaptively filtering the duplicate internal multiples, the separate model of internal multiples for each horizon may fix the incorrect amplitude and polarity characteristics of events due to the duplicate internal multiples that are present in the predicted internal multiples for each of the horizons. The process for generating a separate model of internal multiples for each horizon is described below with reference to FIG. 3.

Figure 3:
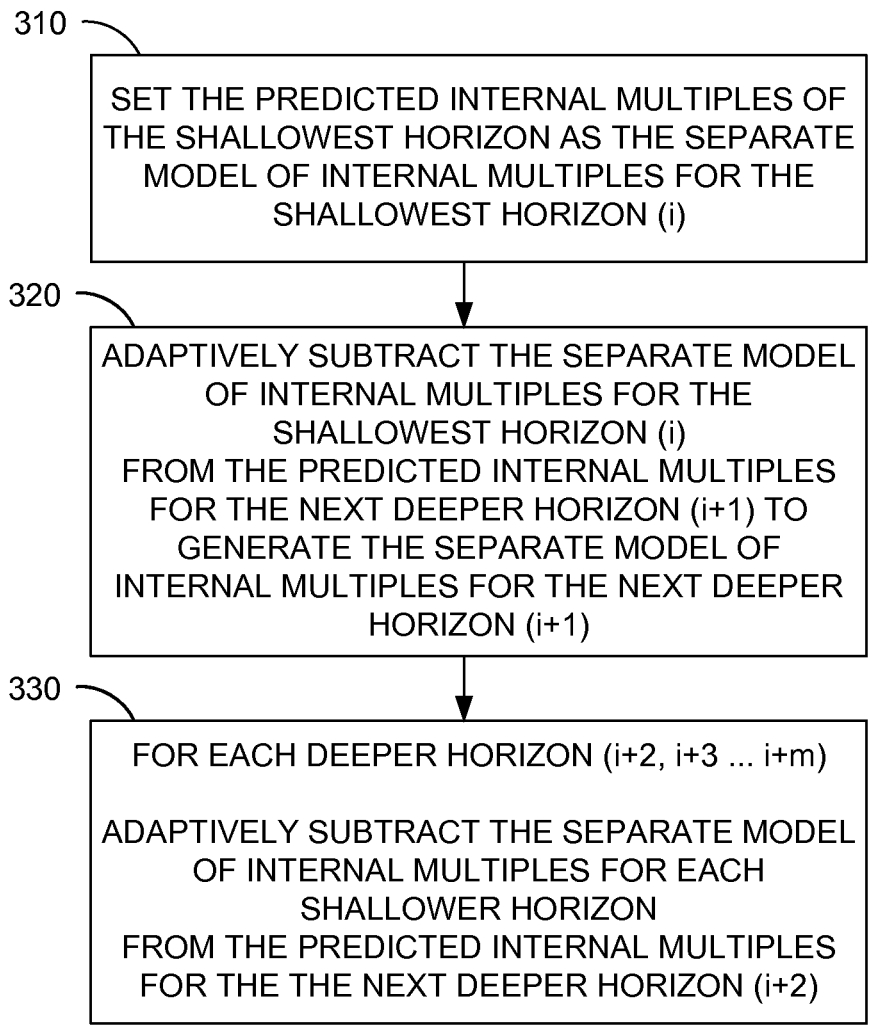
FIG. 3 illustrates a flow diagram of a method for creating separate models of internal multiples for each horizon in accordance with implementations of various techniques described herein.

Referring to FIG. 3, at step 310, the computer application may set the predicted internal multiples for the shallowest horizon (i) (e.g., horizon 1) to be the separate model of internal multiples for the shallowest horizon (i). This is because the predicted internal multiples for the shallowest horizon (i) do not include any duplicate internal multiples from other horizons since there are no other horizons that are shallower than horizon (i).

At step 320, the computer application may adaptively subtract the separate model of internal multiples for the shallowest horizon (i), i.e., the predicted internal multiples for the shallowest horizon (i), from the predicted internal multiples for the next deeper horizon (i+1), e.g., horizon 2. Adaptive subtraction may include identifying multiples of shallower horizons (e.g., horizon 1) in the predicted internal multiples of the next deeper horizon (e.g., horizon 2), and removing the identified multiples from the predicted internal multiples of the next deeper horizon (e.g., horizon 2). In one implementation, the internal multiples of shallower horizons may be identified based on the time at which they occur. For instance, the internal multiples for a particular horizon may occur at the same time in the predicted internal multiples for subsequent horizons. In this manner, the computer application may be able to identify the internal multiples of shallower horizons in the predicted internal multiples of deeper horizons because the internal multiples for each horizon may occur at the same time for each predicted internal multiples of each deeper horizon.

By adaptively subtracting the separate model of internal multiples for the shallowest horizon (i) from the predicted internal multiples for the next deeper horizon (i+1), the computer application may remove the duplicate internal multiples for the shallowest horizon (i) that may be present in the predicted internal multiples for the next deeper horizon (i+1). In this manner, the predicted internal multiples for the next deeper horizon (i+1) may include a model of just the internal multiples for the next deeper horizon (i+1) (e.g., horizon 2). Accordingly, the output of step 320 may be a separate model of internal multiples for horizon (i+1) (e.g., horizon 2).

Figure 4A:
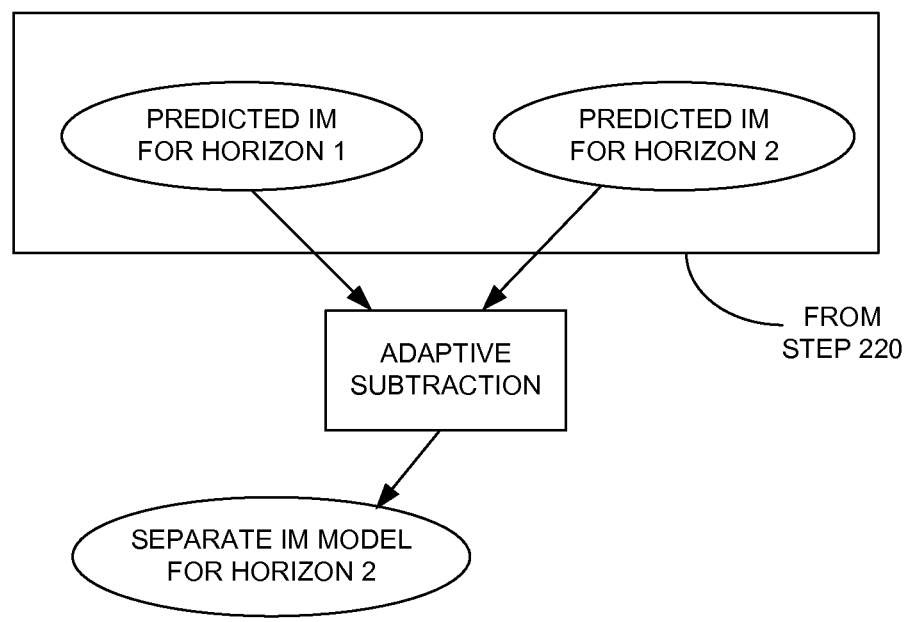
FIG. 4A illustrates a data flow diagram of a method for creating a separate model of internal multiples for a second horizon in accordance with implementations of various techniques described herein.

FIG. 4A illustrates how the separate model of internal multiples for horizon 2 is generated by adaptively subtracting the separate model of internal multiples for horizon 1 (i.e., shallowest horizon) from the predicted internal multiples for the next deeper horizon (i.e., horizon 2). As mentioned in step 310 above, in order to perform step 320, the predicted internal multiples for horizon 1 may be set as the separate model of internal multiples for horizon 1. As such, the separate model of internal multiples for horizon 1 is adaptively subtracted from the predicted internal multiples for horizon 2 to generate the separate model of internal multiples for horizon 2.

At step 330, the adaptive subtraction step described in step 320 may be iteratively repeated for each deeper horizon (i.e., i+2, i+3 . . . i+m) until a separate model of internal multiples has been generated for each deeper horizon. As such, the computer application may adaptively subtract each separate model of internal multiples for each of the horizons that are shallower (e.g., horizon i, horizon i+1) than a particular horizon (e.g., horizon i+2) from the predicted internal multiples for the particular horizon.

In order to create separate models of internal multiples for each horizon, the separate model of internal multiples for the immediately preceding horizon should have been created. Accordingly, in order to create the separate model of internal multiples for deep horizons, the separate model of internal multiples for each preceding horizon should be created first.

For example, in order to create the separate model of internal multiples for horizon 3, the separate model of internal multiples for horizon 2 should first be created. In order to create the separate model of internal multiples for horizon 2, separate model of internal multiples for horizon 1 (i.e., the predicted internal multiples of horizon 1) may be adaptively subtracted from the predicted internal multiples for horizon 2. Now, in order to create the separate model of internal multiples for horizon 3, the separate model of internal multiples for horizon 1 and the separate model of internal multiples for horizon 2 may each be adaptively subtracted from the predicted internal multiples for horizon 3.

Figure 4B:
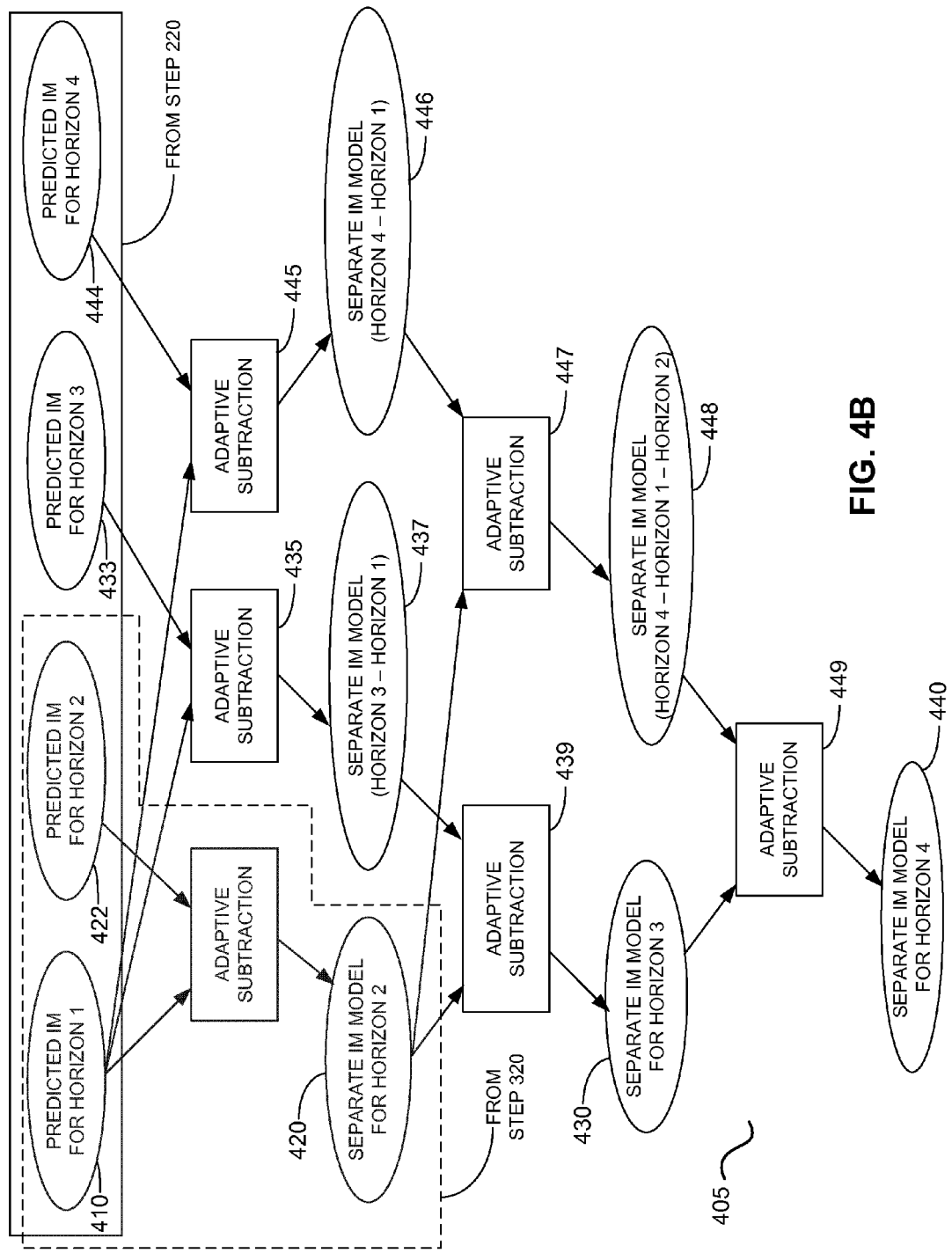
FIG. 4B illustrates a data flow diagram of a method for creating a separate model of internal multiples for a third horizon and a fourth horizon in accordance with implementations of various techniques described herein.

FIG. 4B illustrates how the adaptive subtraction process described in step 330 for a third horizon (e.g., horizon 3) and a fourth horizon (e.g., horizon 4) may be performed. In order to create the separate model of internal multiples for horizon 3 (reference 430), the separate model of internal multiples for horizon 1 (reference 410) and the separate model of internal multiples for horizon 2 (reference 420) should be created first. The separate models of internal multiples for horizons 1 and 2 (reference 410 and 420) may be obtained using the process described above (i.e., step 310 and step 320). After obtaining the separate models of internal multiples for horizons 1 and 2 (reference 410 and 420), the computer application may adaptively subtract (reference 435) the separate model of internal multiples for horizon 1 (reference 410) from the predicted internal multiples for horizon 3 (reference 433), which was determined at step 220. The result of this adaptive subtraction (reference 435) may include a separate internal multiple model for horizon 3 that does not include internal multiples due to horizon 1 but does include internal multiples due to horizon 2 (reference 437). The computer application may then adaptively subtract (reference 439) the separate model of internal multiples for horizon 2 (reference 420) from the separate internal multiple model for horizon 3 that does not include internal multiples due to horizon 1 but does include internal multiples due to horizon 2 (reference 437). As a result, the computer application may obtain the separate model of internal multiples for horizon 3 (reference 430).

Similarly, in order to create the separate model of internal multiples for horizon 4, the separate model of internal multiples for horizons 1, 2 and 3 should be created first. The separate model of internal multiples for horizons 1, 2 and 3 may be obtained using the process described above. After obtaining the separate models of internal multiples for horizons 1, 2 and 3, the computer application may adaptively subtract (reference 445) the separate model of internal multiples for horizon 1 (reference 410) from the predicted internal multiples for horizon 4 (reference 444), which was determined at step 220. The result of this adaptive subtraction may include a separate internal multiple model for horizon 4 that does not include internal multiples due to horizon 1 but does include internal multiples due to horizons 2 and 3 (reference 446). The computer application may then adaptively subtract (reference 447) the separate model of internal multiples for horizon 2 (reference 420) from the separate internal multiple model for horizon 4 that does not include internal multiples due to horizon 1 but does include internal multiples due to horizons 2 and 3 (reference 446). As a result, the computer application may obtain the separate model of internal multiples for horizon 4 that does not include internal multiples due to horizons 1 and 2 but does include internal multiples due to horizon 3 (reference 448). The computer application may then adaptively subtract (reference 449) the separate model of internal multiples for horizon 3 (reference 430) from the separate internal multiple model for horizon 4 that does not include internal multiples due to horizons 1 and 2 but does include internal multiples due to horizon 3 (reference 448). As a result, the computer application may obtain the separate model of internal multiples for horizon 4 (reference 440).

Referring back to step 230, after creating the separate model of internal multiples for each horizon, the computer application may proceed to step 240. At step 240, the computer application may iteratively subtract each separate model of internal multiples for each horizon from the seismic data received at step 210. For example, the computer application may iteratively subtract each separate model of internal multiples for each horizon from the seismic data by first subtracting the separate model of internal multiples for the shallowest horizon from the seismic data to generate seismic data without internal multiples from the shallowest horizon. The computer application may then subtract the separate model of internal multiples for the subsequent horizon from the seismic data without internal multiples from the shallowest horizon to generate seismic data without internal multiples from the shallowest horizon and the subsequent horizon. This process may be repeated until each separate model of internal multiples for each horizon has been subtracted from the seismic data.

Figure 4C:
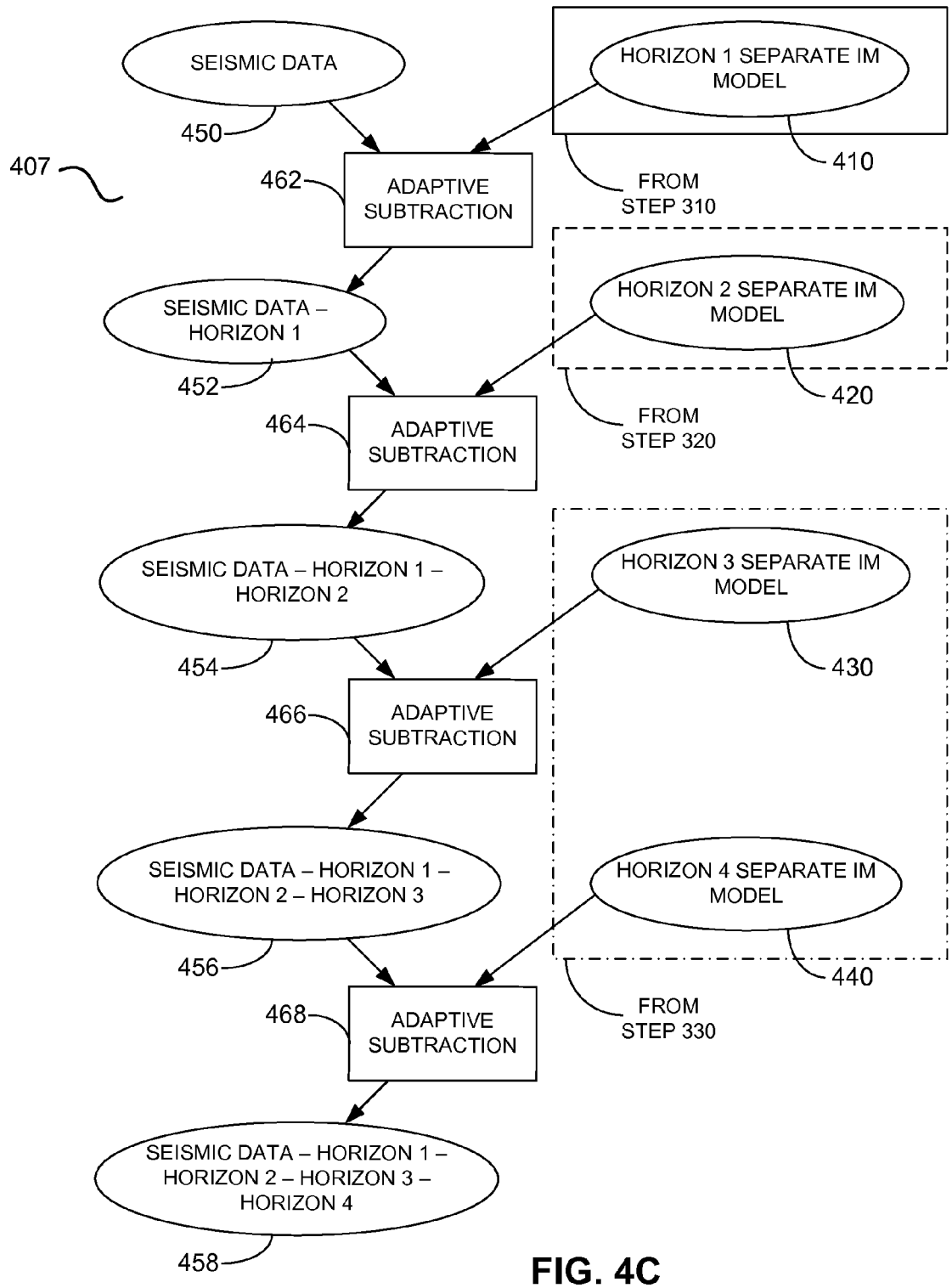
FIG. 4C illustrates a data flow diagram of a method for removing internal multiples from seismic data in accordance with implementations of various techniques described herein.

FIG. 4C illustrates the iterative subtraction process performed at step 240 for the four horizon system described in FIG. 4B. As shown in FIG. 4C, the computer application may first subtract (reference 462) the separate model of internal multiples for horizon 1 (i.e., shallowest horizon, reference 410) from the seismic data (reference 450) to generate seismic data without internal multiples from horizon 1 (reference 452). The computer application may then subtract (reference 464) the separate model of internal multiples for horizon 2 (determined at step 320, reference 420) from the seismic data without internal multiples from horizon 1 (reference 452) to generate seismic data without internal multiples from horizons 1 and 2 (reference 454). The computer application may then subtract (reference 466) the separate model of internal multiples for horizon 3 (determined at step 330, reference 430) from the seismic data without internal multiples from horizons 1 and 2 (reference 454) to generate seismic data without internal multiples from horizons 1, 2 and 3 (reference 456). The computer application may then subtract (reference 468) the separate model of internal multiples for horizon 4 (determined at step 330, reference 440) from the seismic data without internal multiples from horizons 1, 2 and 3 (reference 456) to generate seismic data without internal multiples from horizons 1, 2, 3 and 4 (reference 458).

Although FIGS. 4A-4C illustrate an example of performing method 200 for a four horizon system, it should be understood that method 200 is not limited to a four horizon system. In fact, method 200 may be performed for any number of horizons.

Figure 5:
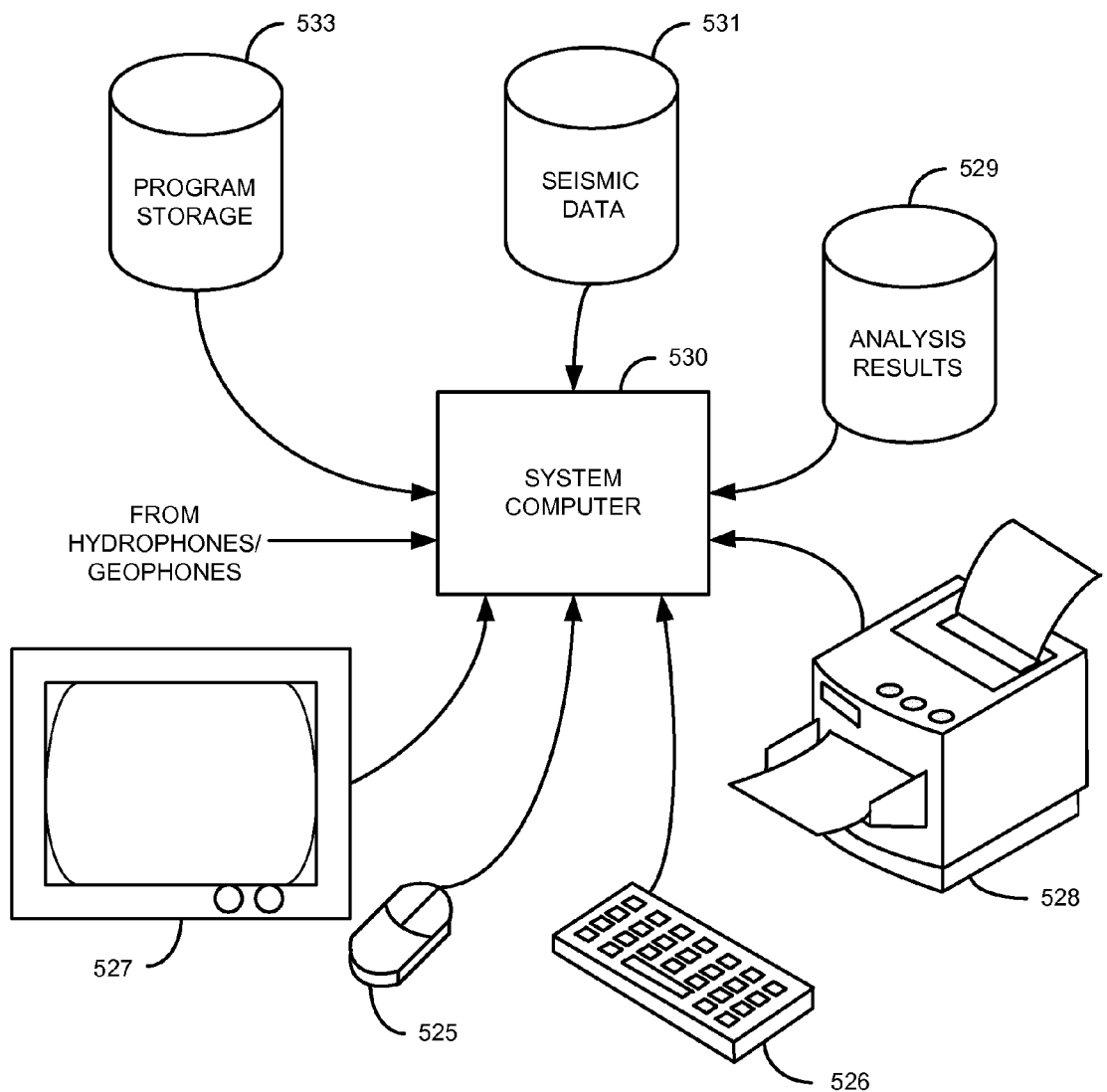
FIG. 5 illustrates a computer network into which various implementations of various technologies described herein may be implemented.

FIG. 5 illustrates a computer network 500, into which implementations of various techniques described herein may be implemented. The computer network 500 may include one or more system computers 530, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from receivers may be stored in disk storage device 531. The system computer 530 may retrieve the appropriate data from the disk storage device 531 to remove internal multiple from seismic data according to program instructions that correspond to the methods described herein. The program instructions may be written in a computer programming language, such as C++, Java and the like. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. In one implementation, these signals and data may be sent to the system computer 530 directly from sensors, such as geophones, hydrophones and the like. When receiving data directly from the sensors, the system computer 530 may be described as part of an in-field data processing system. In another implementation, the system computer 530 may process seismic data already stored in the disk storage 531. When processing data stored in the disk storage 531, the system computer 530 may be described as part of a remote data processing center, separate from data acquisition. The system computer 530 may be configured to process data as part of the in-field data processing system, the remote data processing system or a combination thereof. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While certain implementations have been disclosed in the context of seismic data collection and processing, those with skill in the art will recognize that the disclosed methods can be applied in many fields and contexts where data involving multiple reflective layers (e.g., horizons) may be collected and processed, e.g., medical imaging techniques such as tomography, ultrasound, MRI and the like, SONAR techniques and the like.

While the foregoing is directed to implementations of various techniques described herein, other and further implementations may be devised without departing from the basic scope thereof, and the scope thereof is determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data having internal multiples, wherein the internal multiples are generated from a plurality of rock layer horizons in earth and acquired by a seismic survey for determining the structure of subterranean formations in the earth, comprising:
   receiving the seismic data wherein at least a portion of the internal multiples represent noise;
   predicting internal multiples for each horizon in the seismic data in one pass;
   creating a separate model of internal multiples for each horizon based on the predicted internal multiples for each horizon;
   iteratively subtracting each separate model of internal multiples for each horizon from the seismic data to generate noise attenuated seismic data; and
   using a processor, processing the noise attenuated seismic data from which each separate model of internal multiples for each horizon has been subtracted to output analysis results of rock layers in the earth to a display that indicate the presence or absence of probable locations of hydrocarbon deposits;
   wherein creating the separate model of internal multiples for each horizon comprises adaptively subtracting predicted internal multiples of shallower horizons from the predicted internal multiples for each horizon; and
   wherein adaptively subtracting the predicted internal multiples of shallower horizons from the predicted internal multiples for each horizon comprises:
   (a) identifying internal multiples of each shallower horizon in one or more predicted internal multiples for an $i^{th}$ horizon;
   (b) removing the identified multiples; and
   (c) repeating steps (a)-(b) for each subsequent horizon.

2. The method of claim 1, wherein the internal multiples for each horizon are predicted based on an internal multiple prediction algorithm.

3. The method of claim 2, wherein the internal multiple prediction algorithm comprises:

$$PIM(x_r|x_s;t) = \int_{x_1} dx_1 \int_{x_2} dx_2 D_1(x_s|x_1;t) * D_2(x_1|x_2;t) \cdot D_3(x_2|x_r;t)$$

where PIM represents predicted internal multiples, $x_r$ represents a trace receiver location, $x_s$ represents a source location, $x_1$ represents a variable receiver location of traces with a source at $x_s$ over which an integration occurs, $x_2$ represents a variable source location of traces with a receiver at $x_r$ over which the integration occurs, $D_1$ represents input data with source $x_s$ and receivers at $x_1$ having a top mute of data with times shorter than or equal to a travel time for an event generator, $D_2$ represents input data with source or receiver at $x_1$ and receiver or source at $x_2$, and includes the event generator, $D_3$ represents input data with receiver $x_r$ and sources at $x_2$ having a top mute of data with times shorter than or equal to a travel time for an event generator, t represents time, * represents correlation, and · represents convolution.

4. The method of claim 1, wherein each of the predicted internal multiples for each horizon comprises duplicate internal multiples from shallower horizons.

5. The method of claim 4, wherein each separate model of internal multiples for each horizon is free from the duplicate internal multiples from shallower horizons.

6. The method of claim 1, wherein each separated model of internal multiples for each horizon is iteratively subtracted from the seismic data using an adaptive subtraction technique.

7. A computer system, comprising:
   a processor; and
   a non-transitory memory comprising program instructions executable by the processor to remove internal multiples from seismic data, wherein the internal multiples are generated from a plurality of rock layer horizons in earth and acquired by a seismic survey for determining the structure of subterranean formations in the earth, and wherein the program instructions are executable by the processor to:
   receive the seismic data wherein at least a portion of the internal multiples represent noise;
   predict internal multiples for each horizon in the seismic data in one pass;
   create a separate model of internal multiples for each horizon based on the predicted internal multiples for each horizon; and
   iteratively subtract each separate model of internal multiples for each horizon from the seismic data to generate noise attenuated seismic data, wherein the noise attenuated seismic data from which each separate model of internal multiples for each horizon has been subtracted are analyzed to output analysis results of rock layers in the earth to a display that indicate the presence or absence of probable locations of hydrocarbon deposits,
   wherein the program instructions executable by the processor to create the separate model of internal multiples for each horizon comprises program instructions to adaptively subtract predicted internal multiples of shallower horizons from the predicted internal multiples for each horizon; and
   wherein the program instructions executable by the processor to adaptively subtract the predicted internal multiples of shallower horizons from the predicted internal multiples for each horizon comprises program instructions to:
   (a) identify internal multiples of each shallower horizon in one or more predicted internal multiples for an $i^{th}$ horizon;
   (b) remove the identified multiples; and
   (c) repeat steps (a)-(b) for each subsequent horizon.

8. The computer system of claim 7, wherein the internal multiples for each horizon are predicted based on an internal multiple prediction algorithm.

9. The computer system of claim 8, wherein the internal multiple prediction algorithm comprises:

$$PIM(x_r|x_s;t) = \int_{x_1} dx_1 \int_{x_2} dx_2 D_1(x_s|x_1;t) * D_2(x_1|x_2;t) \cdot D_3(x_2|x_r;t)$$

where PIM represents predicted internal multiples, $x_r$ represents a trace receiver location, $x_s$ represents a source location, $x_1$ represents a variable receiver location of traces with a source at $x_s$ over which an integration occurs, $x_2$ represents a variable source location of traces with a receiver at $x_r$ over which the integration occurs, $D_1$ represents input data with source $x_s$ and receivers at $x_1$ having a top mute of data with times shorter than or equal to a travel time for an event generator, $D_2$ represents input data with source or receiver at $x_1$ and receiver or source at $x_2$, and includes the event generator, $D_3$ represents input data with receiver $x_r$ and sources at $x_2$ having a top mute of data with times shorter than or equal to a travel time for an event generator, t represents time, * represents correlation, and · represents convolution.

10. The computer system of claim 7, wherein each of the predicted internal multiples for each horizon comprises duplicate internal multiples from shallower horizons.

11. The computer system of claim 7, wherein each separated model of internal multiples for each horizon is iteratively subtracted from the seismic data using an adaptive subtraction technique.

12. A method for processing data having internal signal multiples generated from a plurality of reflective layers, the method comprising:
receiving the data wherein the data are acquired by a seismic survey for determining the structure of subterranean formations in the earth and wherein at least a portion of the internal signal multiples represent noise;
predicting internal signal multiples for at least two of the plurality of rock layer reflective layers in earth;
creating a separate model of internal signal multiples for each of the at least two of the plurality of reflective layers based on the predicted internal signal multiples; and
iteratively subtracting each separate model of internal signal multiples from the data to generate noise attenuated data, wherein the noise attenuated data from which each separate model of internal multiples has been subtracted are analyzed to output analysis results of rock layers in the earth to a display that indicate the presence or absence of probable locations of hydrocarbon deposits;
wherein creating the separate model of internal multiples for each of the at least two of the plurality of reflective layers comprises adaptively subtracting predicted internal multiples of shallower reflective layers from the predicted internal multiples for each of the at least two of the plurality of reflective layers; and
wherein adaptively subtracting the predicted internal multiples of shallower reflective layers from the predicted internal multiples for each of the at least two of the plurality of reflective layers comprises:
(a) identifying internal signal multiples of each shallower reflective layer in one or more predicted internal signal multiples for an ith reflective layer;
(b) removing the identified signal multiples; and
(c) repeating steps (a)-(b) for each subsequent reflective layer.

13. The method of claim 12, wherein the internal signal multiples for each of the at least two of the plurality of reflective layers are predicted in one pass.

14. The method of claim 12, wherein each separate model of internal signal multiples for each of the at least two of the plurality of reflective layers is free from the duplicate internal signal multiples from the shallower reflective layers.

15. The method of claim 12, wherein each of the predicted internal signal multiples for the at least two of the plurality of reflective layers comprises duplicate internal signal multiples from one or more shallower reflective layers of the at least two of the plurality of reflective layers.

* * * * *